(12) United States Patent
Le-Gall

(10) Patent No.: US 9,098,426 B2
(45) Date of Patent: Aug. 4, 2015

(54) DIGITAL SERIAL MULTIPLIER

(71) Applicant: STMicroelectronics (Grenoble 2) SAS, Grenoble (FR)

(72) Inventor: Herve Le-Gall, Saint-Martin d'Uriage (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 346 days.

(21) Appl. No.: 13/847,798

(22) Filed: Mar. 20, 2013

(65) Prior Publication Data
US 2013/0304787 A1 Nov. 14, 2013

(30) Foreign Application Priority Data

May 15, 2012 (FR) ...................................... 1254421

(51) Int. Cl.
*G06F 7/523* (2006.01)
*G06F 17/10* (2006.01)
*G06F 7/525* (2006.01)

(52) U.S. Cl.
CPC ................ *G06F 17/10* (2013.01); *G06F 7/525* (2013.01)

(58) Field of Classification Search
None
See application file for complete search history.

(56) References Cited

U.S. PATENT DOCUMENTS

| | | | | |
|---|---|---|---|---|
| 3,670,956 | A | * | 6/1972 | Calhoun ........................ 708/626 |
| 3,816,732 | A | | 6/1974 | Jackson |
| 3,878,985 | A | | 4/1975 | Ghest et al. |
| 3,919,535 | A | | 11/1975 | Vattuone |
| 3,947,670 | A | | 3/1976 | Irwin et al. |
| 4,104,729 | A | | 8/1978 | Gingell |
| 5,095,457 | A | * | 3/1992 | Jeong ............................ 708/626 |
| 5,446,909 | A | * | 8/1995 | Intrater et al. ................... 712/42 |
| 5,883,825 | A | * | 3/1999 | Kolagotla ..................... 708/626 |
| 6,167,421 | A | * | 12/2000 | Meeker et al. ................ 708/626 |
| 6,438,570 | B1 | | 8/2002 | Miller |
| 6,938,061 | B1 | * | 8/2005 | Rumynin et al. ............. 708/210 |
| 7,139,788 | B2 | * | 11/2006 | Talwar et al. ................. 708/626 |
| 8,667,046 | B2 | * | 3/2014 | Brisk et al. .................... 708/700 |
| 2013/0304787 | A1 | * | 11/2013 | Le-Gall ........................ 708/625 |

FOREIGN PATENT DOCUMENTS

GB 1476603 6/1977

* cited by examiner

*Primary Examiner* — David H Malzahn
(74) *Attorney, Agent, or Firm* — Allen, Dyer, Doppelt, Milbrath & Gilchrist, P.A.

(57) ABSTRACT

A multiplier of a binary number A by a binary number B may be configured to add each term $A_iB_j$ with a left shift by i+j bits, where $A_i$ is the bit of weight i of number A, and $B_j$ the bit of weight j of number B. The multiplier may include a first counter associated with the number A and may count modulo n and be paced by a clock. The multiplier may include a second counter associated with the number B and paced by the clock. Switching circuitry may produce the terms $A_iB_j$ by taking the content of the first and second counters respectively as weights i and j. Shifting circuitry is configured to shift the content of one of the first and second counters when the other counter has achieved a revolution.

33 Claims, 3 Drawing Sheets

Fig 1
(Prior Art)
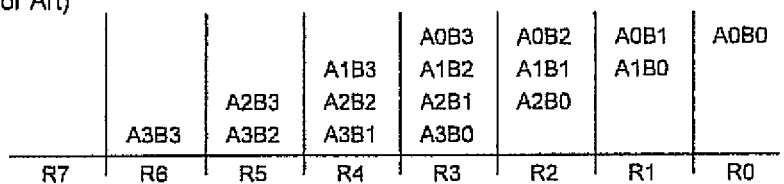
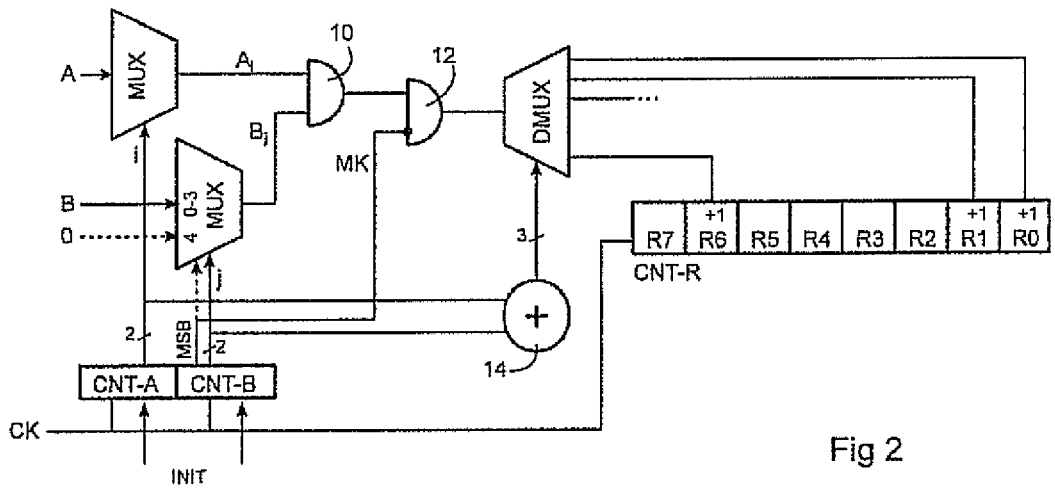
Fig 2
Fig 3
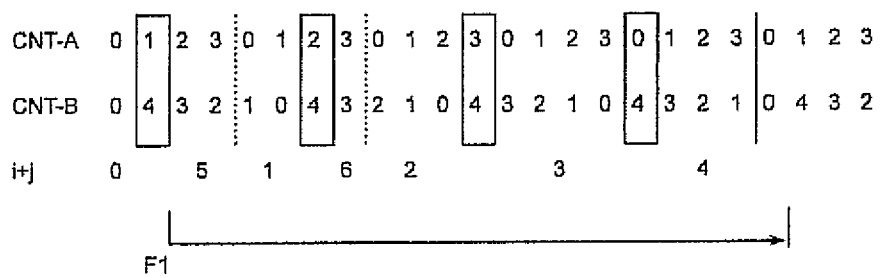
Fig 4
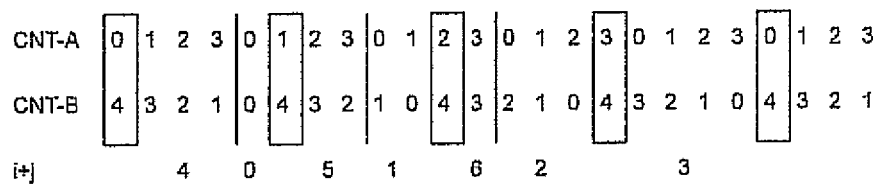

Fig 5
| | | | | | | | | | | | | | | | | | | | | | | | | | |
|---|---|---|---|---|---|---|---|---|---|---|---|---|---|---|---|---|---|---|---|---|---|---|---|---|---|
| CNT-A | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | |
| CNT-B | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | |
| i+j | 0 | 2 | 4 | 6 | | 1 | 3 | 5 | 3 | | 2 | 4 | 2 | 4 | | 3 | 1 | 3 | 5 | | | | | | |
Fig 6a
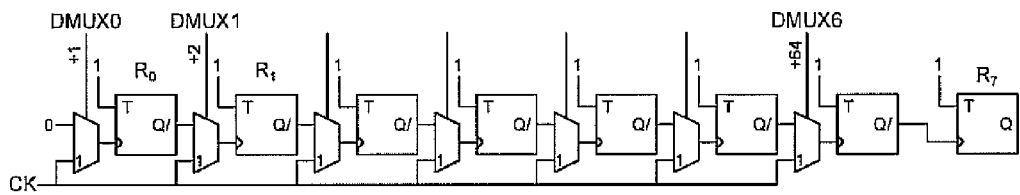
Fig 6b
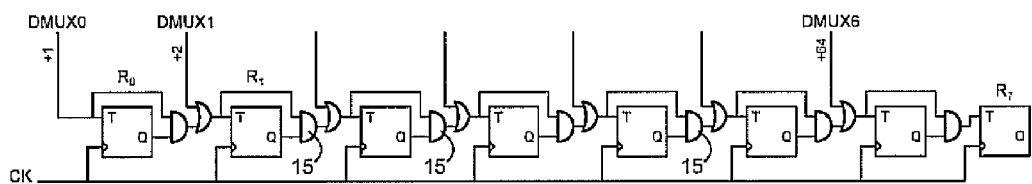
Fig 7
| | | | | | | | | | | | | | | | | | | | | |
|---|---|---|---|---|---|---|---|---|---|---|---|---|---|---|---|---|---|---|---|---|
| CNT-A | 0 | 1 | 2 | 3 | 1 | 2 | 3 | 0 | 2 | 3 | 0 | 1 | 3 | 0 | 1 | 2 | 0 | 1 | 2 | 3 |
| | | | | | +2 | | | | +2 | | | | +2 | | | | +2 | | | |
| CNT-B | 0 | 1 | 2 | 3 | 0 | 1 | 2 | 3 | 0 | 1 | 2 | 3 | 0 | 1 | 2 | 3 | 0 | 1 | 2 | 3 |
| i+j | 0 | 2 | 4 | 6 | 1 | 3 | 5 | 3 | 2 | 4 | 2 | 4 | 3 | 1 | 3 | 5 | | | | |
Fig 8
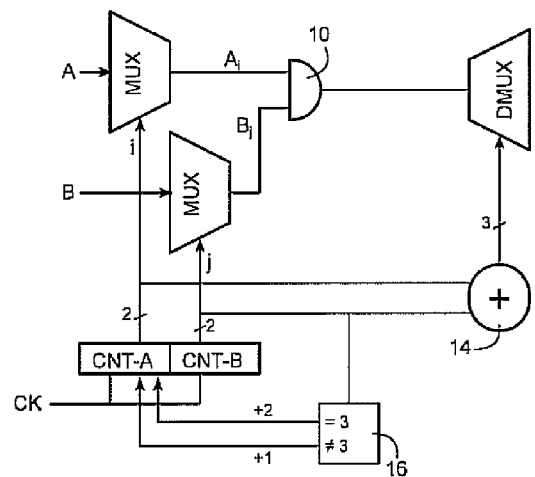

Fig 9
| | | | | | | | | | |
|---|---|---|---|---|---|---|---|---|---|
| CNT-A | 0 | 1 | 3 | 0 | 2 | 3 | 1 | 2 | 0 |
| CNT-B | 0 | 1 | 2 | 3 | 0 | 1 | 2 | 3 | 0 |
| i+j | 0 | 2 | 5 | 3 | 2 | 4 | 3 | 5 | 0 |
| CNT-A/ | 3 | 2 | 0 | 3 | 1 | 0 | 2 | 1 | 3 |
| CNT-B/ | 3 | 2 | 1 | 0 | 3 | 2 | 1 | 0 | 3 |
| i/+j/ | 6 | 4 | 1 | 3 | 4 | 2 | 3 | 1 | 6 |
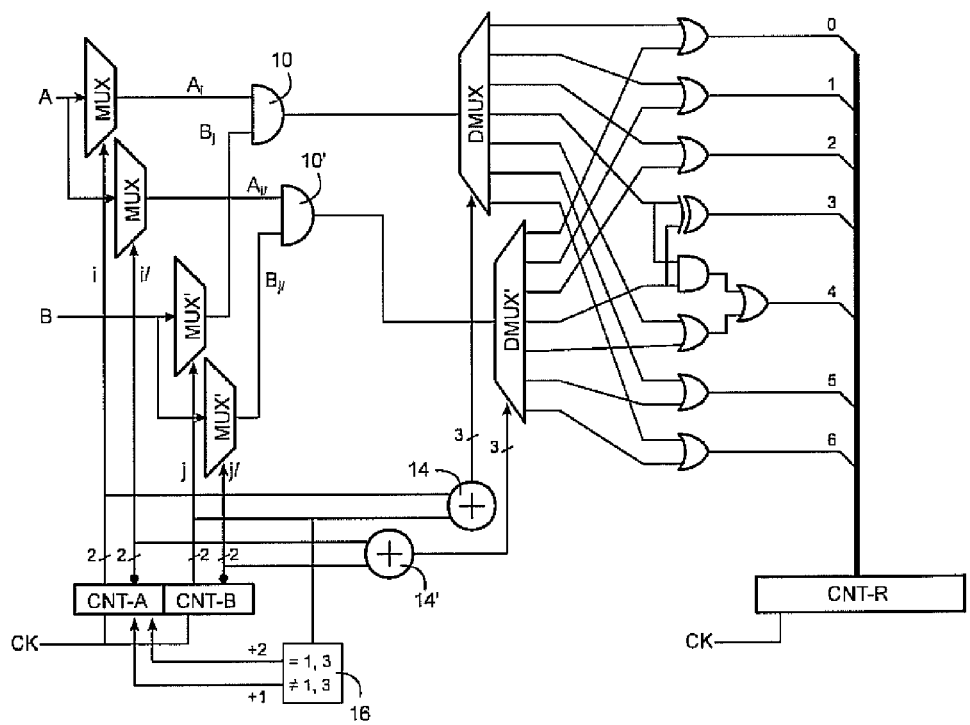
Fig 10
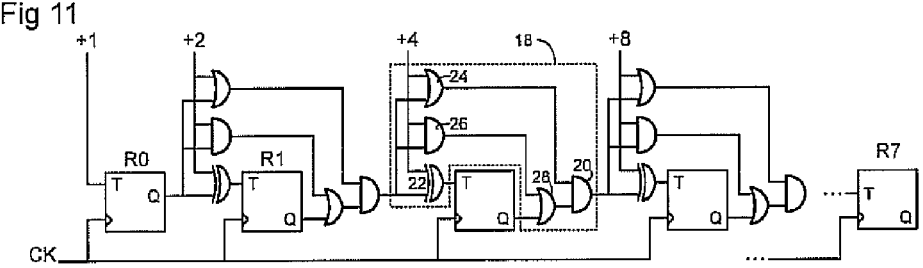
Fig 11

DIGITAL SERIAL MULTIPLIER

FIELD OF THE INVENTION

The invention relates to binary multipliers, and more particularly, to a multiplier to be incorporated into a built-in self-test device.

BACKGROUND OF THE INVENTION

More and more integrated circuits are equipped with built-in self-test devices, also called BIST devices. Such devices are often used in the test phase in the production of integrated circuits. They are designed to assist the test equipment in testing specific functionalities and to reduce the testing time.

Use of a binary multiplier is frequently needed in a BIST device. FIG. 1 shows a multiplication calculation methodology used as a basis for many binary multiplier structures. The aim is to multiply, for example, a binary number A of 4 bits $A_0$ to $A_3$, by a binary number B of four bits $B_0$ to $B_3$. All the partial products or terms $A_iB_j$, sixteen terms in the example, are divided into 7 columns, such that each term $A_iB_j$ is arranged in the column of rank i+j. The ranks of the columns correspond to the weights of the result R of the multiplication.

The result R is obtained by adding the binary numbers formed by the juxtaposed terms of the columns. A column is completed by a 0 when there is no term. The result thus comprises 7 bits R0 to R6 corresponding respectively to the columns, and an additional most significant bit R7 receiving any carry digit of the addition.

Many multiplier structures, which favor calculation speed, such as the Dadda multiplier or Wallace tree multiplier, are designed to perform the operations shown in FIG. 1 in parallel using combinatory logic. The number of logic gates of these structures increases with the square number of the number of bits of the multiplicands. It may be undesirable to sacrifice this area of silicon for an element that does not require a nearly immediate calculation result, as is the case in most built-in test systems.

SUMMARY OF THE INVENTION

It is thus desirable to provide a particularly small multiplier with sufficient performance for use in a BIST device. This desire may be addressed by a multiplier of a binary number A of n bits by a binary number B of p bits, configured to add each term $A_iB_j$ with a left shift by i+j bits, where $A_i$ is the bit of weight i of number A, and $B_j$ the bit of weight j of the number B, with i varying between 0 and n−1, and j varying between 0 and p−1. The multiplier comprises a first counter associated with the number A, configured to count modulo n, and paced by a clock. A second counter is associated with the number B, paced by the clock. The multiplier may also include means or circuitry for sequentially producing the terms $A_iB_j$ by taking the contents of the first and second counters respectively as weights i and j. The multiplier may also include means or circuitry for shifting the content of one of the first and second counters by an increment when the other counter has achieved a revolution.

According to an embodiment, the multiplier comprises, to add the terms $A_iB_j$, a programmable increment counter of n+p bits, paced by the clock and receiving the current term $A_iB_j$ as a setpoint to program an increment of $2^{i+j}$. The programmable increment counter may include a series of cascade-connected flip-flops such that if the programming input of rank i+j is active, the flip-flop of rank i+j toggles systematically, and any flip-flop of rank k>i+j toggles if the flip-flops of ranks between i+j and k−1 are in an active state.

According to an embodiment, the second counter may be configured to count modulo p+1, and the multiplier may include means or circuitry for excluding the current term $A_iB_j$ when the second counter contains j=p. The second counter may be configured to count modulo p, and the multiplier may include means or circuitry for incrementing the first counter by an increment greater than or equal to 2 upon each revolution of the second counter.

According to an embodiment, the first counter may be configured to count up and the second counter is configured to count down. According to an embodiment, the means or circuitry for producing the terms $A_iB_j$ may comprise two multiplexers respectively receiving the numbers A and B, and whose select commands are respectively supplied by the first and second counters. An AND gate may combining the outputs of the multiplexers.

According to an embodiment, the means or circuitry for excluding the term $A_iB_j$ may comprise a gate configured to cancel the term when the second counter contains p. According to an embodiment, to exclude the term $A_iB_j$, the multiplexer associated with number B may comprise a (p+1)-th input selectable by the content (j) of the second counter, and which receives the value 0.

BRIEF DESCRIPTION OF THE DRAWINGS

FIG. 1 is a table illustrating a methodology for multiplying binary numbers in accordance with the prior art.

FIG. 2 is a schematic diagram of a serial multiplier in accordance with an embodiment of the present invention.

FIG. 3 is a diagram showing a first operating mode of the multiplier in FIG. 2.

FIG. 4 is a diagram showing an alternative operation of the multiplier in FIG. 2.

FIG. 5 is a diagram showing a second operating mode of the multiplier in FIG. 2.

FIG. 6a is a schematic diagram of an asynchronous programmable increment counter in accordance with an embodiment of the present invention.

FIG. 6b is a schematic diagram of a synchronous programmable increment counter in accordance with an embodiment of the present invention.

FIG. 7 is a diagram showing an operating mode of a multiplier devoid of phantom cycles in accordance with the present invention.

FIG. 8 is a schematic diagram of a portion of a serial multiplier enabling operation according to the diagram in FIG. 7 and in accordance with an embodiment of the present invention.

FIG. 9 is a diagram showing a serial multiplier operating mode of a multiplier enabling the number of cycles for a multiplication to be reduced in accordance with the present invention.

FIG. 10 is a schematic diagram of a serial multiplier operating according to the mode of FIG. 9 and in accordance with an embodiment of the present invention.

FIG. 11 is a schematic diagram of a portion of a synchronous programmable increment counter in accordance with an embodiment of the present invention.

DETAILED DESCRIPTION OF THE PREFERRED EMBODIMENTS

In a BIST device, the calculation speed (e.g. high) of a multiplier may be relatively unimportant. In most situations, it is possible to merely provide a serial multiplier producing a result in at least $n^2$ clock cycles, where n is the size of the multiplicands. Even if existing serial structures are particularly simple, the aim is to further reduce the occupied surface area of silicon.

FIG. 2 schematically represents one embodiment of a serial multiplier with a particularly simple structure. To be more precise, the multiplier has a parallel-serial structure, as the multiplicands A and B are provided in parallel, while the partial products $A_iB_j$ are produced in series. The multiplicands A and B may have different sizes, for example, respectively n and p bits.

The multiplicands A and B are supplied to respective multiplexers MUX, of n bits to 1 and of p bits to 1. The select inputs of the multiplexers respectively receive the weights i and j of the bits $A_i$ and $B_j$ to be selected in the numbers A and B, where i varies between 0 and n−1, and j varies normally between 0 and p−1. The selected bits $A_i$ and $B_j$ are combined by an AND gate 10 to produce the current term $A_iB_j$.

The weight i used to do the selection of the bit $A_i$ is supplied by a counter CNT-A configured to count modulo n, while the weight j used to do the selection of the bit $B_j$ is supplied by a counter CNT-B configured to count modulo p+1. The counters CNT-A and CNT-B are paced by a system clock CK and their initial content can be programmed by initialization lines INIT.

It is noted, with this configuration, that the weight j can reach the value p, which is a value not corresponding to any bit of number B, since the maximum weight of the bits of number B may be p−1. However, this possibility is authorized and, when it occurs, the value of the current term $A_iB_j$ is ignored. To ignore such a term, given the structure of the multiplier, it is sufficient to cancel it. This is done, for example, using an AND gate 12 which combines the output of gate 10 and a masking signal MK, active when the counter CNT-B contains value p.

In the example represented, n=p=4. The counter CNT-A is a counter on 2 bits, while the counter CNT-B is a counter on 3 bits. The counter CNT-B can theoretically count between 0 and 7, but may be configured in practice to count between 0 and 4. The masking signal MK is then the value of the most significant bit MSB of the counter CNT-B. This most significant bit may furthermore not be part of the value j supplied to the multiplexer, as represented.

According to an alternative, to ignore the term $A_iB_j$ when the weight j is not within the limits, the multiplexer associated with the number B can comprise, as represented in dotted lines, five inputs instead of four, and the fifth input, that is selected when j=4, receives the value 0 constantly. In this case, as represented in dotted lines, the most significant bit MSB of the counter CNT-B is part of the value j supplied to the multiplexer.

Generally speaking, for a number B of p bits and a counter CNT-B counting modulo p+1, the multiplexer associated with the number B comprises p+1 inputs, the last of which, selected when j=p, receives 0 constantly. The terms $A_iB_j$ produced sequentially by the gate 10 are supplied to a demultiplexer 1 towards 7 DMUX. The select input of the demultiplexer receives the output of an adder 14 that supplies the sum of the weights i and j of the current term $A_iB_j$, these weights being respectively supplied by the counters CNT-A and CNT-B.

Therefore, the output line of the demultiplexer towards which the current term $A_iB_j$ is directed is representative of the left shift to be performed to sum the term, i.e. of the rank of the column in which the term is arranged according to the representation in FIG. 1.

The summation of the terms $A_iB_j$ is done using a programmable increment counter CNT-R, paced by the clock CK. The increments are programmable by powers of 2. The size in bits of the counter is that n+p of the result R to be produced, i.e. eight bits R0 to R7 in the example. The counter comprises n+p−1=7 increment programming inputs, respectively for the bits R0 to R6, receiving the outputs of the demultiplexer DMUX.

The operation of the counter CNT-R is as follows. When a programming input of rank k is on 1, the value formed by the bits of rank k and above is incremented by 1 upon the next active edge of the clock CK, which amounts to incrementing the counter by $2^k$. In theory, several programming inputs can be on 1, but in the structure in FIG. 2, only one input is on 1 at once, which occurs when the current term $A_iB_j$, transmitted on one of the outputs of the demultiplexer DMUX, is on 1. The content of the counter CNT-R remains unchanged when all the programming inputs are on 0. With this configuration, each term $A_iB_j$ is added to the content of the counter CNT-R at the position i+j, which corresponds to the addition of the term to the content of a register with a left shift by i+j bits, or even to the addition of the term after multiplying it by $2^{i+j}$.

FIG. 3 is a diagram showing a first operating mode of the multiplier in FIG. 2. The counter CNT-A is configured to count up and the counter CNT-B is configured to count down. The initial values of the two counters are programmed on 0. Therefore, at the pace of the clock CK, and within the framework of the example with n=p=4, the counter CNT-A counts 0, 1, 2, 3, 0, 1 . . . while the counter CNT-B counts 0, 4, 3, 2, 1, 0, 4, 3 . . . .

Upon the first clock cycle CK, the term $A_0B_0$ is added to the position 0 of the counter CNT-R. Upon the second cycle, the counter CNT-B includes the value 4, which is not within the limits. The term $A_1B_4$, not being defined, is cancelled and the content of the counter CNT-R remains unchanged. Upon the next two cycles, the terms $A_2B_3$ and $A_3B_2$ are successively added to the position 5 of the counter CNT-R, and so on and so forth.

After 20 cycles, all the terms $A_iB_j$ have been added to the corresponding positions of the counter CNT-R, which then includes the result R of the multiplication. It can be seen that the weights i and j of the terms $A_iB_j$ vary in any way during the clock cycles. This may important as the addition is commutative, and the final result is the same provided that the terms are taken into account with the proper shift and are all scanned. These properties are thus used to generate the sequence of the terms $A_iB_j$ in a relatively simple way using two simple counters counting continuously.

The price of this relative simplicity is the generation of phantom cycles corresponding to the phases in which the counter CNT-B is not within the limits. In the example in FIG. 3, four phantom cycles are counted, represented in frames, and sixteen useful cycles. For 4-bit numbers, one cycle in five is a phantom cycle.

By starting the counters of the values 2 and 3, i.e. by starting just after the first phantom cycle, as represented by a range F1, the multiplication is performed in 19 cycles instead of 20. After the 19$^{th}$ cycle, instead of ending on the values 1 and 4, corresponding to a phantom cycle, the counters are forced to their starting values 2 and 3. In this case, each multiplication is performed in 19 cycles instead of 20.

Generally speaking, the proportion of phantom cycles is 1 for each revolution of the counter CNT-B, or of the counter that has the greatest number of cycles to count. Therefore, this proportion decreases when the number of bits of the multiplicands increases. The proportion can be further decreased by selecting the starting values of the counters just after a phantom cycle, which enables the number of phantom cycles per multiplication phase to be reduced by 1.

FIG. 4 is a diagram showing an alternative in which the counters CNT-A and CNT-B start at their default initial values, i.e. the values taken after a simple reset of the counters. The structure of the counters is then simplified by the omission of the circuits used to program the starting values (INIT).

Therefore, upon the first clock cycle, the counters CNT-A and CNT-B have just been initialized to their default values 0 and 4. The first cycle is a phantom cycle, since the value 4 is not within the limits. The terms $A_iB_j$ are then produced according to a sequence different from FIG. 3, but this does not impact the end result given the commutative property of the addition. The phantom cycles are represented in frames.

In the example in FIGS. 3 and 4, it can be seen that terms with the same position i+j in the result R are all produced consecutively, according to the sequence of positions 0, 5, 1, 6, 2, 3, 4 in FIG. 3 and according to the sequence 4, 0, 5, 1, 6, 2, 3 in FIG. 4. Now, the terms with the same position in the result need not be produced consecutively, due to the commutative property of the addition.

FIG. 5 is a diagram showing a second operating mode producing a sequence of terms according to non-consecutive positions i+j. Here the counter CNT-B is configured to count up, like the counter CNT-A. The counters CNT-A and CNT-B respectively count from 0 to 3 and from 0 to 4.

Upon the first cycle, the counters have been reset and each include the value 0. During the first four clock cycles, the contents of the counters CNT-A and CNT-B vary identically. Upon the fifth cycle, a phantom cycle, the counter CNT-A overruns and comes back to 0, while the counter CNT-B reaches its maximum value 4, to come back to 0 upon the sixth cycle.

The position in the result of the terms $A_iB_j$ changes upon each cycle. This enables two counters of the same nature to be used starting from their reset value.

The multiplication is over at the $19^{th}$ cycle, and the $20^{th}$ cycle is a phantom cycle. This phantom cycle can thus be removed in consecutive multiplications by forcing the counters to reset at the end of each $19^{th}$ cycle.

FIG. 6a schematically represents one embodiment of a programmable increment counter CNT-R. This embodiment is shown based on an asynchronous counter architecture.

An asynchronous counter comprises a series of cascade-connected T flip-flops, the clock input of each flip-flop receiving the Q/ inverted output of the previous flip-flop. The clock input of the first flip-flop receives the counting clock, and each flip-flop receives the value 1 at its toggle input T. With this configuration, each flip-flop toggles every time the Q/ output of the previous flip-flop has a rising edge, i.e. when the previous flip-flop toggles from 1 to 0.

In FIG. 6a, the counter comprises as many flip-flops ($R_0$-$R_7$) as bits in the result R of the multiplication. The clock input of each flip-flop is preceded by a multiplexer that selects either the Q/ output of the previous flip-flop or the clock signal CK. The multiplexer associated with the first flip-flop R0 receives the value 0 instead of the Q/ output of a flip-flop.

The selection commands of the multiplexers are the increment programming inputs connected to the outputs of the demultiplexer DMUX in FIG. 2. When a programming input is on 0, the multiplexer selects the Q/ output of the previous flip-flop according to a traditional asynchronous counter configuration. For the first flip-flop, the multiplexer selects the value 0. Therefore, if all the programming inputs are on 0, the counter does not receive any clock signal and keeps its content.

When a programming input of rank k is on 1, the multiplexer directs the clock CK towards the flip-flop $R_k$. Therefore, if only this programming input is on 1, the others being on 0, the flip-flops $R_k$ to $R_7$ act like an 8-k-bit counter that is incremented upon the net falling edge of the clock CK, while the flip-flops $R_0$ to $R_{k-1}$ are fixed.

FIG. 6b schematically represents one embodiment of a programmable increment counter with a synchronous structure. A synchronous counter comprises a series of T flip-flops paced simultaneously by a same clock CR. The toggle input T of each flip-flop is connected to be active only if all the lower-ranking flip-flops are on 1. This is achieved by a series of cascade-connected AND gates 15. Each AND gate controls the T input of an associated flip-flop and combines the Q output of the previous flip-flop with the output of the previous AND gate. The T input of the first flip-flop normally receives the value 1 continuously, and the AND gate preceding the second flip-flop is thus optional.

To make the increment programmable, an OR gate is provided between each AND gate 15 and the T input of the associated flip-flop. A first input of the OR gate receives the output of the AND gate, and a second input of the OR gate forms an increment programming input, the rank of which is the one of the associated flip-flop. With this configuration, when a programming input of rank k is put to 1, the OR gate forces to 1 the T input of the flip-flop of rank k. The flip-flop then toggles upon each clock edge independently of the states of the lower-ranking flip-flops, incrementing the content of the counter by $2^k$ upon each cycle.

The T input of the first flip-flop directly receives the programming input of rank 0. The diagrams in FIGS. 3-5 show that, to generate the sequence of the weights i and j of the terms $A_iB_j$, it is sufficient to take the contents of two counters that count continuously, respectively modulo n and p, by shifting the content of one of the counters by one step every time the other counter has done a revolution.

In the previous examples, the content of the counter CNT-B is shifted upon each revolution due to the fact that it counts one step more per revolution. The same effect could be obtained with a counter CNT-B that counts modulo p instead of p+1, but that is stopped for one cycle after each revolution. In this case, in FIG. 5, the sequence 0, 1, 2, 3, 3, 0 . . . is obtained for the counter CNT-B. This amounts to decrementing the counter CNT-B by 1 upon each revolution. These two alternatives produce phantom cycles.

FIG. 7 is an operating diagram resulting from a transformation of the diagram in FIG. 5, enabling the phantom cycles to be removed. The counter CNT-B is here configured to count up modulo p (4 in the example), instead of counting modulo p+1.

The shifting by one step between the counters upon each revolution is obtained in the following manner, for example. Every time the counter CNT-B reaches its maximum value p−1, the counter CNT-A is incremented by 2 instead of 1 upon the next cycle for a single cycle. The phantom cycle existing in the diagram in FIG. 5 is thus skipped.

In fact, it may not be desirable to set the threshold to p−1 to trigger the one-step shift. It is sufficient for the counter CNT-B to have done a revolution which can start at any value between 0 and p−1.

Furthermore, the increment used for the shift can be different from 2. The set of values that the increment can take depends on the properties of the operands. When the operands have an equal number of bits, the increment can take as a value any whole number Ic ranging between 2 and p−1, such that Ic−1 and p are prime to each other. The possible values of the increment Ic are summarized in the following table for examples of operand sizes.

| Operand size | Possible values for Ic |
|---|---|
| 4 bits | 2 |
| 5 bits | 2, 3, 4 |
| 6 bits | 2 |
| 7 bits | 2, 3, 4, 5, 6 |
| 8 bits | 2, 4, 6 |
| 9 bits | 2, 3, 5, 6, 8 |
| 10 bits | 2, 4, 8 |
| 16 bits | 2, 4, 6, 8, 10, 12, 14 |

Those skilled in the art will be able to find definition sets for the increment Ic when the operands have different sizes.

FIG. 8 schematically and partially represents one embodiment of a serial multiplier enabling this operation to be obtained. The structure of this multiplier is based on that of FIG. 2. Similar elements are referred to by the same references.

The counter CNT-B is configured to count up modulo p instead of p+1. The masking circuit shown in FIG. 2, formed by the gate 12 controlled by a masking signal MK, is no longer found.

The counter CNT-A is a programmable increment counter. It could have the same structure as that of FIG. 6a. In practice, only the programming inputs of ranks 0 and 1, enabling, respectively, a step +1 and a step +2 to be selected for the increments are desired. Therefore, the counter has a classic structure from its third flip-flop, if more than 2 bits are needed for the counter.

A comparator 16 observes the output j of the counter CNT-B. When j is equal to p−1 (3 in the example), the comparator programs the increment +2 of the counter CNT-A. When j is different from p−1, i.e. in all the other cases, the comparator programs the increment +1 of the counter CNT-A.

The serial multiplier embodiments described herein do a multiplication in n×p cycles, where n and p are the respective sizes of the operands A and B. When the sizes are equal and a power of 2, it may be possible to divide the number of cycles by 2 by increasing the surface area of the circuit according to an acceptable compromise.

To do so, provision is made to produce two distinct simultaneous sequences of terms $A_iB_j$ and to sum them two by two. The first sequence, noted $A_iB_j$, is produced directly by the counters CNT-A and CNT-B, and the second sequence, noted $A_{i/}B_{j/}$ is produced by the complements of the counters CNT-A and CNT-B. In addition, the manner of shifting the counter CNT-A is changed so that all the terms to be summed are produced without any duplications or missing terms.

FIG. 9 is a diagram showing an example of producing suitable sequences for 4-bit operands. Starting from the diagram in FIG. 7, the counter CNT-A, in addition to being incremented by 2 upon each revolution of the counter CNT-B, is further incremented by 2 upon each mid-revolution of the counter CNT-B. In other words, for 4-bit operands, the counter CNT-A is incremented by 2 every time the content of the counter CNT-B has an odd value.

The diagram indicates the resulting sequences for the values i+j, i/+j/, and the complements CNT-A/, CNT-B/, of the counters CNT-A and CNT-B. It can be seen that all the combinations of the pairs (i, j) are represented over 8 cycles in the values taken by the counters or their complements.

FIG. 10 schematically represents one embodiment of a multiplier operating according to the mode of FIG. 9. The structure in FIG. 8 is found again twice. A first set of multiplexers MUX, AND gate 10, and demultiplexer DMUX is associated with the direct contents of the counters CNT-A and CNT-B, supplied by the Q outputs of the flip-flops forming these counters. A second set of multiplexers MUX', AND gate 10', and demultiplexer DMUX' is associated with the complements of the contents of the counters CNT-A and CNT-B, supplied by the Q/ outputs of the flip-flops forming these same counters.

The demultiplexers DMUX, DMUX' are respectively controlled by the values i+j and i/+j/, produced respectively by the adder 14 and an adder 14' receiving the complements of the contents of the counters CNT-A and CNT-B. The sum of the two numbers formed by the outputs of the demultiplexers is used to program the increment of the counter CNT-R. In the example, two 6-bit numbers are summed, which may require, in theory, a comprehensive 6-bit adder. In reality, given the special structure used, it transpires that a simple OR gate is sufficient to add the most significant bits and the least significant bits. Indeed, as shown in the diagram in FIG. 9, in most cycles, the ranks of the outputs of the two demultiplexers, defined by the values i+j and i/+j/, are different. The result is that an inevitably zero bit is added to a possibly non-zero bit, which only requires a simple OR gate.

It is for the central rank, 3 in the example, that two bits which can both be on 1 are summed. To do so, a semi-adder formed, as represented, by an OR-exclusive gate and an AND gate, each receiving the outputs of rank 3 of the two demultiplexers, is provided. The OR-exclusive gate supplies the bit of rank 3 of the sum and the AND gate supplies a carry digit. The bit of rank 4 of the sum is formed by an OR of the outputs of rank 4 of the two demultiplexers, followed by an OR with the carry digit. There is no other carry digit to be taken into account as, if the semi-adder produces a carry digit, this means that all the outputs of the demultiplexers, except those of rank 3, are zero.

The comparator 16, which determines the value of the increment to be applied to the counter CNT-A, is configured to compare the content of the counter CNT-B with the values 1 and 3, i.e. the median value and the maximum value of the content of the counter. With this structure, the increment programmed for the counter CNT-R can be of any type, and different from a power of 2. In other words, several increment programming inputs can be simultaneously on 1. The counter structures in FIGS. 6a and 6b may not work in such a situation.

FIG. 11 partially represents one embodiment of a programmable increment counter enabling any number of programming inputs to be put to 1. This counter has a synchronous architecture, like the one in FIG. 6b, i.e. the toggle input T of a flip-flop is only active, normally, if all the lower-ranking flip-flops are on 1.

In addition, a logic cell 18 is associated with each flip-flop to both "request" a toggle from the next cell through an AND gate 20 and decide to toggle the current flip-flop through an XOR gate 22, the output of which is connected to the T input of the flip-flop. A toggle "request" is equivalent, in a conventional synchronous counter, to the indication that all the lower-ranking flip-flops are at "1" and thus that the next flip-flop must toggle. In the structure of FIG. 11, it is further determined, according to the programming input, whether the current flip-flop is effectively toggled and whether the toggle request is propagated.

The cell 18 is configured to toggle the associated flip-flop upon the next clock edge CK, if one of the following conditions is met:

a) The programming input is at 0 and the previous cell requests the toggle of the flip-flop (case of the conventional synchronous counter).

b) The programming input is at 1, and the previous cell does not request the toggle of the flip-flop (case of the counter in FIG. 6b with a single programming input at 1).

This functionality is obtained using the XOR gate 22, a first input of which is connected to the programming input, and a second input of which receives the output of the AND gate 20 of the previous cell.

The cell 18 is further configured to freeze the flip-flop if one of the following conditions is met:

c) The programming input is at 0 and the previous cell does not request the toggle of the flip-flop (case of the conventional synchronous counter).

d) The programming input is at 1, and the previous cell requests the toggle of the flip-flop. In other words, if the toggle is "requested" twice, the flip-flop does not toggle, which in fact amounts to toggling the flip-flop twice. This occurs when a lower-ranking flip-flop has its programming input at 1.

This functionality is also obtained using the XOR gate 22. A toggle request is produced by the AND gate 20 in the following cases:

e) In case a) when the flip-flop contains 1.

f) In case b) when the flip-flop contains 1.

g) In case d), independently of the content of the flip-flop. It is assumed that the flip-flop has toggled twice even though it was frozen. If it includes 0, this means that the flip-flop transitioned to 1 (virtually) and that a corresponding toggle request must be propagated.

The functions e) and f) are obtained by an OR gate 24 combining the toggle request of the previous cell and the programming input. A first input of the AND gate 20 receives the output of gate 24, and a second input receives the Q output of the flip-flop.

The function g) is obtained by an AND gate 26 combining the toggle request of the previous cell and the programming input. An OR gate 28 is inserted between the Q output of the flip-flop and gate 20, and forces the second input of gate 20 to 1 when the output of gate 26 is active.

That which is claimed is:

1. A multiplier for multiplying a binary number A of n bits by a binary number B of p bits and configured to add each term $A_iB_j$ with a left shift by i+j bits, where $A_i$ is a bit of weight i of the binary number A, and $B_j$ a bit of weight j of the binary number B, with i varying between 0 and n−1, and j varying between 0 and p−1, the multiplier comprising:
   a first counter associated with the binary number A and configured to count modulo n and be clocked by a clock;
   a second counter associated with the binary number B and configured to be clocked by the clock;
   switching circuitry configured to sequentially produce terms $A_iB_j$ by at least defining the weights i and j based upon contents of said first and second counters respectively; and
   shifting circuitry configured to shift the content of one of said first and second counters by an increment when the other of said first and second counters has executed a revolution.

2. The multiplier according to claim 1, further comprising, to add the terms $A_iB_j$, a programmable increment counter of n+p bits and configured to be clocked by the clock and receive a current term $A_iB_j$ as a setpoint to program an increment of $2^{i+j}$.

3. The multiplier according to claim 2, wherein said programmable increment counter comprises a series of cascade-connected flip-flops configured to, if the programming input of rank i+j is active, toggle the flip-flop of rank i+j systematically, and toggle any flip-flop of rank k>i+j if flip-flops of ranks between i+j and k−1 are active.

4. The multiplier according to claim 1, wherein said second counter is configured to count modulo p+1; and wherein the multiplier further comprises logic circuitry configured to exclude a current term $A_iB_j$ when said second counter has the bit weight j being equal to the bit weight p.

5. The multiplier according to claim 4, wherein said logic circuitry comprises a logic gate configured to cancel the term $A_iB_j$ when said second counter includes p.

6. The multiplier according to claim 1, wherein said second counter is configured to count modulo p; and wherein said shifting circuitry is configured to increment said first counter by an increment greater than or equal to 2 upon each revolution of said second counter.

7. The multiplier according to claim 1, wherein said first counter is configured to count up and wherein said second counter is configured to count down.

8. The multiplier according to claim 1, wherein said switching circuitry further comprises:
   two multiplexers configured to respectively receive the binary numbers A and B, and to receive select commands respectively from said first and second counters, said two multiplexers each having a respective output; and
   an AND gate configured to combine the outputs of said two multiplexers.

9. The multiplier according to claim 8 wherein, one of said two multiplexers associated with the binary number B comprises a (p+1)-th input receiving a value 0 and configured to be selectable based upon the content of said second counter.

10. A multiplier for multiplying a binary number A of n bits by a binary number B of p bits and configured to add each term $A_iB_j$ with a left shift by i+j bits, where $A_i$ is a bit of weight i of the binary number A, and $B_j$ a bit of weight j of the binary number B, the multiplier comprising:
    a first counter associated with the binary number A;
    a second counter associated with the binary number B;
    switching circuitry configured to sequentially produce terms $A_iB_j$ by at least defining the weights i and j based upon contents of said first and second counters respectively; and
    shifting circuitry configured to shift the content of one of said first and second counters when the other of said first and second counters has executed a revolution.

11. The multiplier according to claim 10, wherein said first counter is configured to count modulo n; and wherein said multiplier further comprises, to add the terms $A_iB_j$, a programmable increment counter of n+p bits and configured to operate based upon a clock and program an increment of $2^{i+j}$ based upon a current term $A_iB_j$.

12. The multiplier according to claim 11, wherein said programmable increment counter comprises a series of cascade-connected flip-flops configured to, if the programming input of rank i+j is active, toggle the flip-flop of rank i+j, and toggle any flip-flop of rank k>i+j if flip-flops of ranks between i+j and k−1 are active.

13. The multiplier according to claim 10, wherein said second counter is configured to count modulo p+1; and wherein the multiplier further comprises logic circuitry configured to exclude a current term $A_iB_j$ when said second counter has the bit weight j being equal to the bit weight p.

14. The multiplier according to claim 13, wherein said logic circuitry comprises a logic gate configured to cancel the term $A_iB_j$ when said second counter includes p.

15. The multiplier according to claim 10, wherein said second counter is configured to count modulo p; and wherein said shifting circuitry is configured to increment said first counter by an increment greater than or equal to 2 upon each revolution of said second counter.

16. The multiplier according to claim 10, wherein said first counter is configured to count up and wherein said second counter is configured to count down.

17. The multiplier according to claim 10, wherein said switching circuitry further comprises:
two multiplexers configured to respectively receive the binary numbers A and B, and to receive select commands respectively from said first and second counters, said two multiplexers each having a respective output; and
an AND gate configured to combine the outputs of said two multiplexers.

18. The multiplier according to claim 17 wherein, one of said two multiplexers associated with the binary number B comprises a (p+1)-th input configured to be selectable based upon the content of said second counter.

19. A method of multiplying a binary number A of n bits by a binary number B of p bits and by adding each term $A_i B_j$ with a left shift by i+j bits, where $A_i$ is a bit of weight i of the binary number A, and $B_j$ a bit of weight j of the binary number B, the method comprising:
using switching circuitry to produce terms $A_i B_j$ by at least defining the weights i and j based upon contents of first and second counters respectively, the first and second counters being associated with the binary number A and the binary number B, respectively; and
using shifting circuitry to shift the content of one of the first and second counters when the other of the first and second counters has executed a revolution.

20. The method according to claim 19, wherein the first counter counts modulo n; and wherein the method further comprises, to add the terms $A_i B_j$, operating a programmable increment counter of n+p bits based upon a clock and program an increment of $2^{i+j}$ based upon a current term $A_i B_j$.

21. The method according to claim 20, wherein operating the programming increment counter comprises operating a series of cascade-connected flip-flops to, if the programming input of rank i+j is active, toggle the flip-flop of rank i+j, and toggle any flip-flop of rank k>i+j if flip-flops of ranks between i+j and k−1 are active.

22. The method according to claim 19, wherein the second counter counts modulo p+1; and wherein the method further comprises using logic circuitry to exclude a current term $A_i B_j$ when the second counter has the bit weight j being equal to the bit weight p.

23. The method according to claim 19, wherein the second counter is configured to count modulo p; and wherein using the shifting circuitry comprises incrementing the first counter by an increment greater than or equal to 2 upon each revolution of the second counter.

24. The method according to claim 19, wherein using the switching circuitry further comprises:
using two multiplexers to respectively receive the binary numbers A and B, and receive select commands respectively from the first and second counters; and
combine outputs of the two multiplexers using an AND gate.

25. A multiplier for multiplying a binary number A of n bits by a binary number B of p bits and configured to add each term $A_i B_j$ with a left shift by i+j bits, where $A_i$ is a bit of weight i of the binary number A, and $B_j$ a bit of weight j of the binary number B, with i varying between 0 and n−1, and j varying between 0 and p−1, the multiplier comprising:
a first counter associated with the binary number A and connected to be clocked by a clock;
a second counter associated with the binary number B;
switching circuitry configured to sequentially produce terms $A_i B_j$ by at least defining the weights i and j based upon contents of said first and second counters respectively; and
for adding the terms $A_i B_j$, a programmable increment counter of n+p bits, configured to be clocked by the clock and receive a current term $A_i B_j$ as a setpoint to program an increment of $2^{i+j}$.

26. The multiplier according to claim 25, wherein said programmable increment counter comprises a series of cascade-connected flip-flops configured to, if the programming input of rank i+j is active, toggle the flip-flop of rank i+j systematically, and toggle any flip-flop of rank k>i+j if flip-flops of ranks between i+j and k−1 are active.

27. The multiplier according to claim 25, wherein the second counter is configured to count modulo n and is clocked by the clock, the multiplier further comprising shifting circuitry configured to shift the content of one of said first and second counters by an increment when the other of said first and second counters has executed a revolution.

28. The multiplier according to claim 27, wherein said second counter is configured to count modulo p+1; and wherein the multiplier further comprises logic circuitry configured to exclude a current term $A_i B_j$ when said second counter has the bit weight j being equal to the bit weight p.

29. The multiplier according to claim 28, wherein said logic circuitry comprises a logic gate configured to cancel the term $A_i B_j$ when said second counter includes p.

30. The multiplier according to claim 27, wherein said second counter is configured to count modulo p; and wherein said shifting circuitry is configured to increment said first counter by an increment greater than or equal to 2 upon each revolution of said second counter.

31. The multiplier according to claim 27, wherein said first counter is configured to count up and wherein said second counter is configured to count down.

32. The multiplier according to claim 25, wherein said switching circuitry further comprises:
two multiplexers configured to respectively receive the binary numbers A and B, and to receive select commands respectively from said first and second counters, said two multiplexers each having a respective output; and
an AND gate configured to combine the outputs of said two multiplexers.

33. The multiplier according to claim 32 wherein, the multiplexer associated with the binary number B comprises a (p+1)-th input receiving a value 0 and configured to be selectable based upon the content of said second counter.

* * * * *